United States Patent
Rhee et al.

(10) Patent No.: US 8,268,204 B2
(45) Date of Patent: Sep. 18, 2012

(54) METHOD FOR MANUFACTURING SINTERED ANNULAR NUCLEAR FUEL PELLET WITHOUT SURFACE GRINDING

(75) Inventors: Young Woo Rhee, Daejeon (KR); Dong Joo Kim, Daejeon (KR); Kun Woo Song, Daejeon (KR); Ki Won Kang, Daejeon (KR); Jong Hun Kim, Daejeon (KR); Keon Sik Kim, Daejeon (KR); Jae Ho Yang, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 592 days.

(21) Appl. No.: 12/552,480

(22) Filed: Sep. 2, 2009

(65) Prior Publication Data

US 2010/0254847 A1   Oct. 7, 2010

(30) Foreign Application Priority Data

Apr. 6, 2009   (KR) .................. 10-2009-0029330

(51) Int. Cl.
   *B22F 3/12*   (2006.01)
(52) U.S. Cl. ......... 264/0.5; 264/109; 264/667; 264/668; 419/38
(58) Field of Classification Search ............ 264/0.5, 264/109, 667, 668; 419/38; 425/352, 412, 425/416, 425–428
   See application file for complete search history.

(56) References Cited

U.S. PATENT DOCUMENTS

| | | | |
|---|---|---|---|
| 3,761,546 A * | 9/1973 | Wilhelm et al. | 264/0.5 |
| 4,382,048 A | 5/1983 | Harlow | |
| 4,687,605 A | 8/1987 | Cellier et al. | |
| 2005/0261136 A1 * | 11/2005 | Rhee et al. | 505/445 |
| 2008/0185743 A1 | 8/2008 | Yang et al. | |

FOREIGN PATENT DOCUMENTS

| | | |
|---|---|---|
| JP | 5052978 A | 3/1993 |
| JP | 5297186 A | 11/1993 |
| JP | 8029590 A | 2/1996 |
| JP | 11202073 A | 7/1999 |
| JP | 2003107181 A | 4/2003 |
| KR | 20050110757 A | 11/2005 |

OTHER PUBLICATIONS

Kang, Y.H. et al., "Manufacturing process of UO2 Pellets", 1980, 85 pp., KAERI/RR-236/80.
"Fabrication of UO2 sintered pellets in isfahan nuclear technology center", Proceedings of the national conference on nuclear science and technology in Iron, 1986, 17 pp., vol. 1, Atomic Energy Organization of Iran.

* cited by examiner

*Primary Examiner* — Yogendra Gupta
*Assistant Examiner* — Robert J Grun
(74) *Attorney, Agent, or Firm* — The Webb Law Firm

(57) ABSTRACT

A method for manufacturing an annular nuclear fuel pellet is provided. In the method, an annular nuclear fuel green compact whose lateral cross-section is a trapezoid is prepared. The thickness of the annular nuclear fuel green compact reduces along one direction of the central axis, and a green density of the nuclear fuel green compact increases along one direction of the central axis. The annular nuclear fuel green compact is sintered under a reducing gas atmosphere so that the annular nuclear fuel pellet is obtained. According to this method, the annular pellet which has uniform inner and outer diameters and small diametric tolerances along the pellet height is fabricated without grinding the pellet surfaces.

16 Claims, 8 Drawing Sheets

METHOD FOR MANUFACTURING SINTERED ANNULAR NUCLEAR FUEL PELLET WITHOUT SURFACE GRINDING

CROSS-REFERENCE TO RELATED APPLICATIONS

This application claims the priority of Korean Patent Application No. 10-2009-0029330 filed on Apr. 6, 2009, in the Korean Intellectual Property Office, the disclosure of which is incorporated herein by reference.

BACKGROUND OF THE INVENTION

1. Field of the Invention

The present invention relates to a sintered annular pellet, and more particularly, to a method for manufacturing a sintered annular nuclear fuel pellet having small tolerances in its outer and inner diameters so that it may be used for a dual-cooled nuclear fuel rod where heat transfer simultaneously occurs at the inner cladding and the outer cladding.

2. Description of the Related Art

A $UO_2$ pellet is most widely used as a nuclear fuel of a commercial nuclear reactor. The $UO_2$ pellet contains a predetermined amount (for example, about 1 to 5 weight %) of $U^{235}$. While $U^{235}$ that is being used for the fuel of a nuclear reactor decays due to a neutron, it generates nuclear fission energy. The pellet has a cylindrical shape (for example, diameter: about 9 mm, length: about 10 mm) having hollow dishes at its upper and lower surfaces, and having flat chamfers chamfered at its upper and lower edges.

In a commercial nuclear reactor, a nuclear fuel pellet is used in the form of a rod inserted into a zirconium alloy-cladding having a predetermined length (for example, about 4 m). Such a commercial nuclear fuel rod has limited performance in aspects of temperature and heat flux.

Though the $UO_2$ pellet has various advantages as a nuclear fuel, since the $UO_2$ pellet has a low thermal conductivity compared to metal or nitride nuclear fuel, heat generated by nuclear fission is not rapidly transferred to cooling water and the temperature of the pellet becomes very high. For example, the temperature of the cooling water is in the range of about 320 to 340° C., and the temperature of the pellet is highest in its center and lowest at its surface. The temperature in the center of the pellet in a normally burning nuclear fuel rod is in the range of between 1000 to 1500° C. There is a steep temperature gradient along the radial direction of the pellet.

When a pellet is in a high temperature state, a margin for safety in various design basis accidents is reduced. For example, in a loss of coolant accident, as the temperature of a nuclear fuel directly before the accident is high, the margin for safety becomes small. In addition, when the heat flux of a nuclear fuel rod becomes high, departure of nucleate boiling may occur. Since a bubble layer is formed on the surface of a cladding when departure of nucleate boiling occurs, heat transfer is seriously deteriorated, so that a nuclear fuel rod may be destroyed.

To address the above-described problem, U.S. Pat. No. 3,928,132 (Roko Bujas, titled Annular Fuel Element for High Temperature Reactor, 1975) has suggested an annular nuclear fuel rod, which includes an outer cladding 11, an inner cladding 12 disposed coaxially with the outer cladding 11 and having a smaller diameter than that of the outer cladding 11, and an annular pellet 15 inserted between the outer cladding 11 and the inner cladding 12 as illustrated in FIGS. 1 and 2.

Since the conventional annular nuclear fuel rod 10 allows cooling water to additionally flow along the center, where temperatures are highest in the cylinder-shaped commercial nuclear fuel rod, the average temperature of the nuclear fuel rod dramatically decreases, and also, a heat transfer area per nuclear fuel rod increases dramatically and thus heat flux decreases, so that a thermal margin is expected to improve.

However, since heat generated from an annular pellet of the conventional annular nuclear fuel rod is transferred to cooling water via both the inner cladding and the outer cladding, when more heat is transferred to one of the two sides, heat transferred to the other side is reduced. An amount of the generated heat transferred via one of the two claddings is related to the thermal resistances. Since a much greater amount of heat is distributed and flows to a direction having low thermal resistance, a heat flux of one of the two directions becomes much higher than that of the other.

The thermal resistance of a gap existing between the pellet and the claddings occupies about half of the thermal resistance existing in the annular nuclear fuel rod, and the thermal resistance of the gap is in proportion to the size of the gap.

After manufacturing, gaps $d_e$ and $d_i$ between the annular pellet 15 and the claddings 11 and 12 are set to small sizes within a manufacturable range (for example, about 50 to 100 μm) in order to reduce thermal resistance. Recently, as a method for resolving heat flux asymmetry, reducing an inner gap size to 30 μm or less has been suggested.

To obtain the designed gap size, it is very important to minimize the inner and outer diametric tolerances of an annular pellet.

In the conventional nuclear fuel pellet production process, granules or a powder is inserted into a forming mold and then a green compact is manufactured using a double action uni-axial pressing which applies pressure by pressing a vertical forming punch, and then the green compact is sintered. The green compact manufactured using the double action uni-axial pressing process generates sintering deformation such that the diameter of the center is smaller than the diameters of the upper and lower diameters, for example, in the form of a double-headed drum pinched in at the middle or an hourglass during a sintering process. Therefore, a centerless grinding process is performed to allow the pellet to have a constant diameter along the height of the pellet.

The sintering deformation is generated by non-uniform green density distribution which is the most critical problem of the uni-axial pressing. A difference in the green density inside the green compact generates a change in a sintering shrinkage of each part inside the green compact to cause deformation, and in a serious case, may even generate a crack.

FIG. 3 is a schematic view illustrating a green density distribution inside a green compact and pellet shapes depending on a pressing direction.

FIG. 3 illustrates a forming mold 32 and a forming apparatus 30 having an upper punch 31a and a lower punch 31b disposed in the upper and lower portions of the forming mold 32. The non-uniform density distribution generated by forming is due to friction F1 between powder and the forming mold and friction F2 between powder and powder.

Pressure exerted by the forming punches 31a and 31b on the surface of the powder 25 filling the forming mold 32 is lost by friction. Accordingly, actually applied force becomes much smaller than exerted pressure as a distance from a punch surface increases. This region compressed with this low pressure has lower green density than a region where high pressure is exerted. This low density region is densified incompletely or contracts much compared to neighboring other regions during a sintering process.

Green density distribution inside a green compact during a uni-axial pressurizing becomes different depending on a pressing method.

The conventional uni-axial pressing process of granules or putting powder into a forming mold and pressing the powder at the upper and lower sides using punches is schematically illustrated to the right of FIG. 3. The conventional uni-axial forming process can be classified into a single action uni-axial forming and a double action uni-axial forming depending on a pressing direction. Due to friction between powder and powder, and friction between powder and the wall of the forming mold, the pressure exerted by the punches is not uniformly transferred to the inside of the powder, and causes non-uniformity in green density. Green density distribution changes depending on a pressing direction as illustrated in FIG. 3.

In the case of single action pressing, green density reduces toward an upper or lower direction, but in the case of double action pressing, an intermediate portion of a green compact has lowest green density.

The above-described green density non-uniformity causes a different amount of shrinkage after a sintering process. Therefore, the cross-section of a pellet is distorted into a trapezoid, a conical shape, or an hourglass shape as illustrated in FIG. 3.

In the case of a cylindrical pellet, a precise diametric tolerance can be obtained using a centerless grinding process, but in the case of an annular pellet, both the inner and the outer surfaces need to be grinded since a sintering deformation may occur on both the outer surface and the inner surface. The conventional centerless grinding may resolve only outer diametric tolerance, while the grinding process is time consuming and expensive, and the grinding sludge are high-priced enriched uranium. Accordingly, a process for recycling the grinding sludge is also required.

To satisfy the inner diametric tolerance of annular pellet, an inner side needs to be grinded. For grinding the inner side, precise grinding which uses a diamond wheel or a sandblasting process may be used. However, since the inner diameter distribution of an annular pellet is different in every pellet, in the case of grinding using the diamond wheel, unlike centerless grinding, an annular pellet should be taken one by one to perform grinding. Accordingly, productivity is reduced.

A defective product or grinding sludge generated during a nuclear fuel manufacturing process need to be changed into powder through an oxidation process and recycled in general, because enriched uranium is extremely high-priced. However, in case of the sandblasting process, uranium mixes with sand in the grinding sludge, so that difficulties in recycling uranium are to be expected. A problem may be generated in aspects of separating uranium from grinding sludge, and controlling the concentration of impurities.

SUMMARY OF THE INVENTION

An aspect of the present invention provides a method for manufacturing an annular nuclear fuel pellet that can maintain inner and outer diameter tolerance depending on the height (in central axis direction) of the pellet to a low level (for example, 13 μm or less, which is the current tolerance specification of a commercial nuclear fuel pellet) even without a grinding process.

According to an aspect of the present invention, there is provided a method for manufacturing an annular nuclear fuel pellet, the method including preparing an annular nuclear fuel green compact whose lateral cross-section is a trapezoid, and sintering the annular nuclear fuel green compact under a reducing gas atmosphere to obtain the annular nuclear fuel pellet, wherein a thickness of the annular nuclear fuel green compact decreases along one direction of a central axis, and a green density of the nuclear fuel green compact increases along one direction of the central axis.

The preparing of the annular nuclear fuel green compact may include inserting one of nuclear fuel powder or granules into a forming mold for forming a shape of the annular nuclear fuel green compact; and applying a single action uni-axial pressing for a high green density-intended surface to one of the inserted powder or granules.

The forming apparatus may include a forming mold having a first inclined inner wall for providing a forming region, and a second inner wall connected with the first inner wall, a cylindrical inner central portion mounted apart from the second inner wall of the forming mold to form an annular insertion space, a trapezoidal conical inner central portion including an outer wall for forming an annular forming space corresponding to a shape of the annular nuclear fuel green compact when disposed in the forming region; and an annular forming punch which is movable toward the forming space along the annular insertion space, for providing an object located in the annular insertion space to the forming space.

The single action uni-axial pressing may be executed by movement of the annular forming punch. Pressure applied during the single action uni-axial pressing may be in the range of about 1 to 6 ton/cm$^2$.

An inner diameter and an outer diameter of the annular forming punch may be smaller than an inner diameter and an outer diameter of the forming space, respectively.

An incline of an outer wall of the trapezoidal conical inner central portion with respect to a forming axis may be smaller than an incline of a first inner wall of the forming mold with respect to the forming axis.

The outer wall of the trapezoidal conical inner central portion may have a slope angle of more than about 0.001° and less than about 2° with respect to the forming axis. The first inner wall of the forming mold may have a slope angle of more than about 0.001° and less than about 2.5° with respect to the forming axis.

Tolerance of one of an inner diameter and an outer diameter of the annular nuclear fuel pellet obtained after the sintering may be about 13 μm or less.

The reducing gas may be a hydrogen gas. The reducing gas may be a mixture of a hydrogen gas and at least one of carbon dioxide, water vapor, and an inert gas.

The sintering may be performed at temperature in the range of about 1600° C. to 1800° C. One of nuclear fuel powder and granule may be a ceramic material containing at least one fissile material selected from uranium, plutonium, and thorium.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
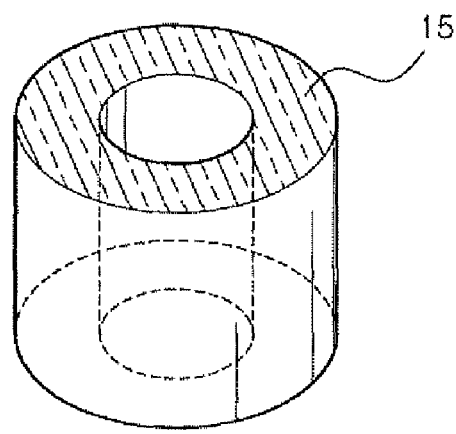
FIG. 1 is a schematic perspective view illustrating a conventional annular nuclear fuel pellet.
Figure 2:
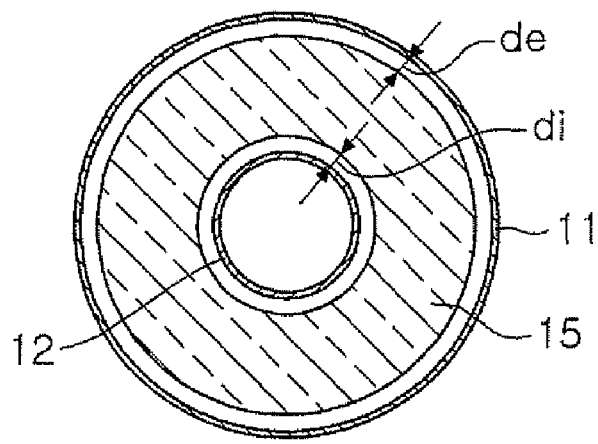
FIG. 2 is a cross-sectional view illustrating a dual-cooled annular nuclear fuel rod which employs the annular nuclear fuel pellet of FIG. 1.
Figure 3:
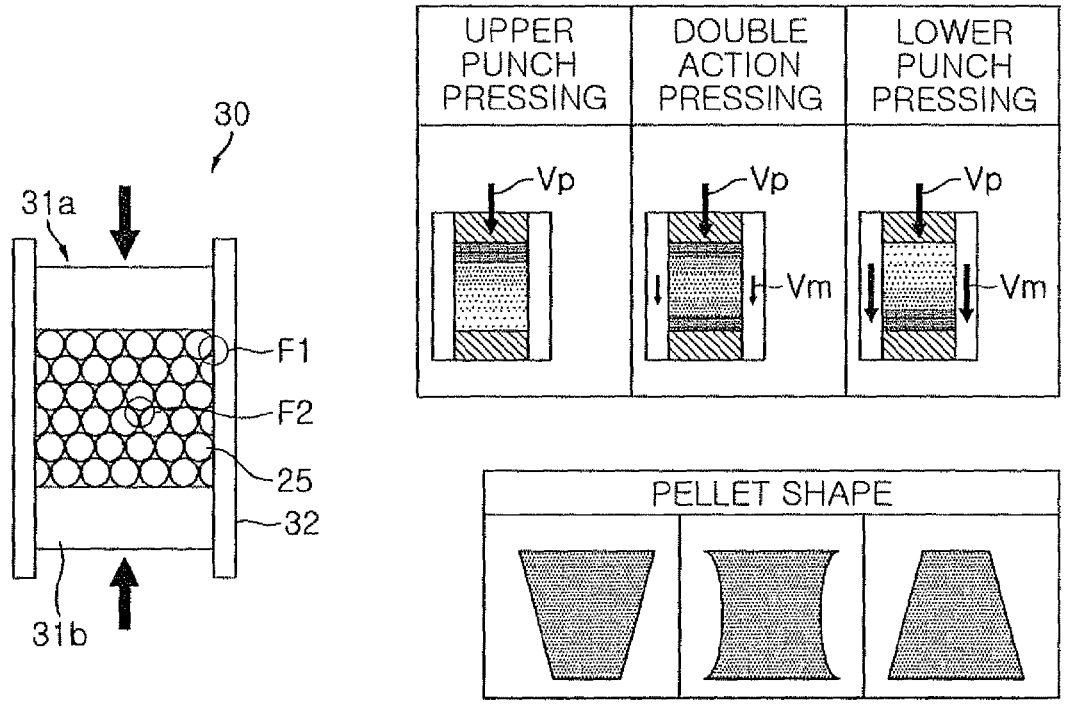
FIG. 3 is a schematic view illustrating a green density distribution inside a green compact and pellet shapes depending on a pressing direction.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Exemplary embodiments of the present invention provide a method for reducing inner and outer diameter tolerances along the central axis direction of a pellet obtained through a sintering process by properly changing the shape of a green compact with consideration of a density gradient of the green compact that depends on a forming method.

More specifically, after a sintering process of a green compact manufactured using a single action uni-axis forming process, an annular green compact having a trapezoidal lateral cross-section has been formed by introducing a forming mold having an inclined wall in order to solve a pellet deformation problem. An inclined wall-type forming mold for manufacturing a desired annular trapezoidal green compact can be designed with consideration of a rate of change in a diameter depending on each location at a green compact on the basis of shrinkage change data depending on green density distribution of a pellet manufactured and sintered using the conventional straight wall-type forming mold.

Hereinafter, an exemplary embodiment of the present invention will be described in more detail with reference to the accompanying drawings.

Figure 4A:
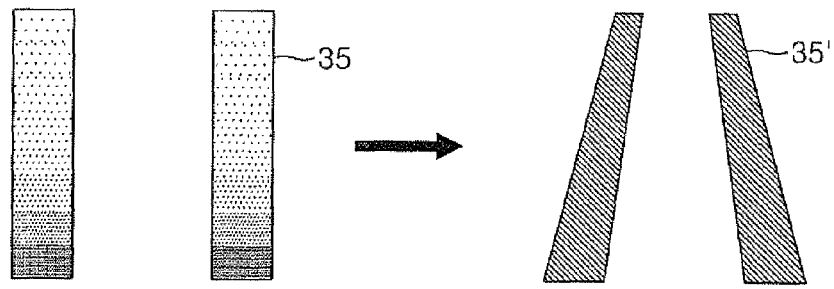
FIGS. 4A and 4B are schematic views illustrating lateral cross-sections of an annular green compact manufactured using a process which uses a straight wall-type forming mold and a inclined wall-type forming mold, and lateral cross-sections of sintered annular pellets.
Figure 4B:
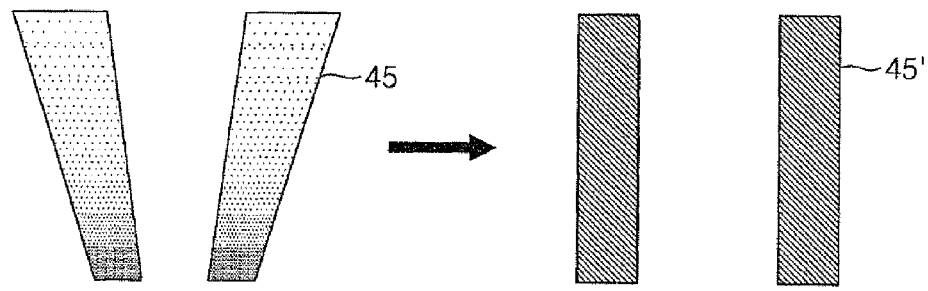

FIGS. 4A and 4B are schematic views illustrating lateral cross-sections 35 and 45 of an annular green compact manufactured using a process which uses a conventional straight wall-type forming mold and an inclined wall-type forming mold, and lateral cross-sections 35' and 45' of annular pellets deformed after sintering.

As illustrated in FIG. 4A, the inner diameter and the outer diameter of the annular green compact 35 on which a single action uni-axis pressing has been performed in a straight wall-type forming mold have constant values along the height direction of the green compact, but green density has a gradient (the green density is high as a distance from the lower surface on which pressure is exerted decreases) in a predetermined direction as illustrated with dot density in FIG. 4.

In the case of sintering the annular green compact 35 on which the single action uni-axis pressing has been performed in a straight wall-type forming mold, as described above, a trapezoidal sintering deformation where the inner diameter and the outer diameter of the upper end are smaller than the inner diameter and the outer diameter of the lower end may be generated during the sintering due to a shrinkage difference between the upper end and the lower end. Consequently, a diameter distribution along the height direction of the pellet is widened, and diametric tolerance increases.

To solve this problem, an exemplary embodiment of the present invention proposes an annular green compact 45 having a trapezoidal lateral cross-section. The green compact 45 having this structure may be manufactured using a single action uni-axis forming process which uses an inclined wall-type forming mold.

The annular pellet 45' of FIG. 4B having uniform inner and outer diameters along the height of the green compact may be manufactured by using a characteristic that a green density gradient (the green density is high as a distance from the lower surface on which pressure is exerted decreases) is generated in the predetermined direction as illustrated with dot density during the single action uni-axis forming, and a sintering shrinkage changes depending on the incline, and by introducing a reverse incline to the forming mold to change the inner and outer diameters of the green compact depending on the height of the green compact.

For this operation, the annular green compact 45 according to an exemplary embodiment of the present invention has an annular structure whose lateral cross-section is a trapezoid. In addition, as illustrated in FIG. 4B, the thickness of the green compact reduces along one direction of the central axis, and green density of the green compact increases along one direction of the central axis.

FIGS. 5A through 5E are schematic views explaining a method for manufacturing an annular nuclear fuel pellet according to an exemplary embodiment of the present invention.

A forming apparatus exemplified in the present process includes a forming mold 51 having a first inclined inner wall for providing a forming region and a second inner wall connected with the first inner wall, a cylindrical inner central portion 52 mounted apart from the second inner wall in order to form an annular insertion space, a trapezoidal conical inner portion 56 for forming an annular forming space corresponding to the shape of the annular nuclear fuel green compact when disposed in the forming region of the forming mold 51, and an annular forming punch 54 which is movable toward the forming region along the annular insertion space, for providing an object located in the annular insertion space to the forming space.

Figure 5A:
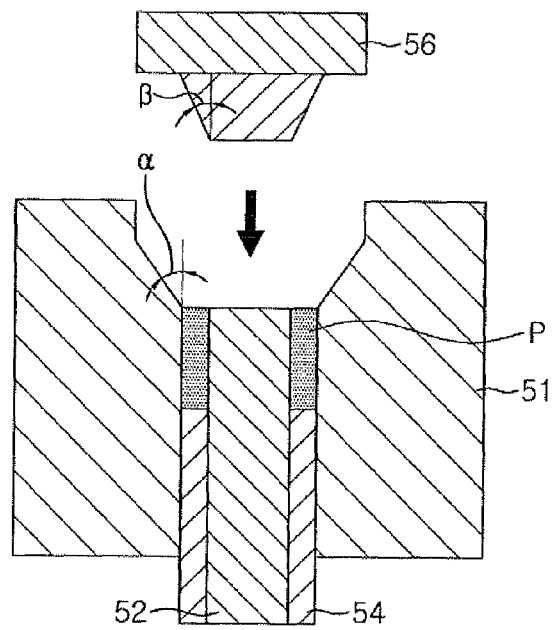
FIGS. 5A through 5E are cross-sectional views for each forming process, explaining a method for manufacturing an annular pellet according to an exemplary embodiment of the present invention.

A method for manufacturing an annular pellet according to an exemplary embodiment of the present invention starts by inserting nuclear fuel powder or granules P into the annular insertion space located between the second inner wall of the forming mold and the cylindrical inner central portion 52 as illustrated in FIG. 5A.

To obtain a trapezoidal annular green compact having a desired thickness variation, a slope angle β of the outer wall of the trapezoidal conical inner portion 56 with respect to the forming axis is made smaller than a slope angle α of the inner wall of the forming mold 51.

The outer wall of the trapezoidal conical inner central portion 56 may have a slope angle greater than about 0.001° and less than about 2° with respect to the forming axis, and the first inner wall of the forming mold 51 may have a slope angle greater than about 0.001° and less than about 2.5° with respect to the forming axis.

The nuclear fuel powder or granules used herein may be a known fissile material. For example, the nuclear fuel powder or granules may be a ceramic material containing one of uranium, plutonium, and thorium.

Figure 5B:
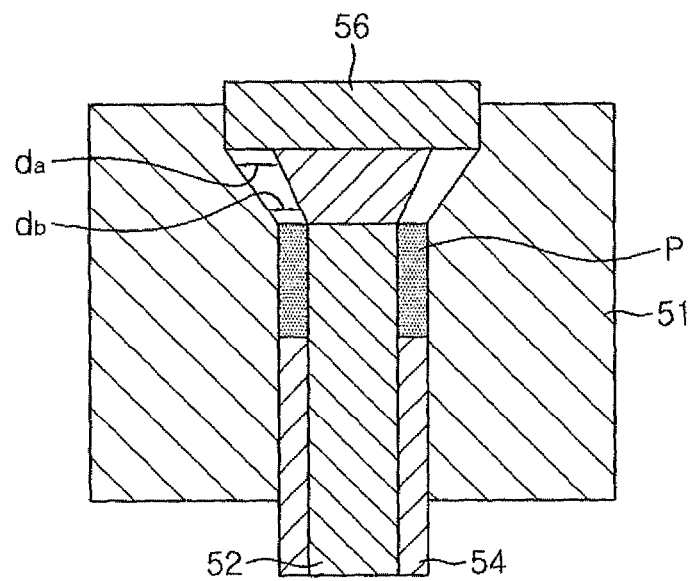

Next, as illustrated in FIG. 5B, the trapezoidal conical inner central portion 56 provided for forming the inner lateral surface of the annular green compact is moved to the forming region of the forming mold 51.

As illustrated in FIG. 5B, when the conical inner central portion 56 is disposed in the forming region of the forming mold 51, an annular forming space corresponding to the shape of the annular nuclear fuel green compact is formed. The above-formed annular forming space may have an inclined shape such that a gap $d_a$ of the upper end is greater than a gap $d_b$ of the lower end by slope conditions of the outer wall of the conical inner central portion 56 and the second inner wall of the forming mold 51.

Figure 5C:
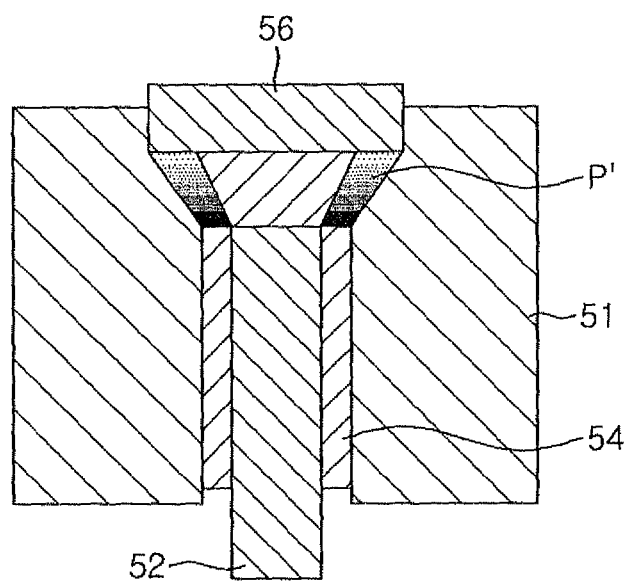

Subsequently, as illustrated in FIG. 5C, an annular forming punch 54 is moved toward the forming space to perform single action pressing on the powder or granules P located in the insertion space, so that an annular nuclear fuel green compact P', whose lateral cross-section is a trapezoid, is manufactured. The inner and outer diameters of the annular forming punch 54 may be smaller than the inner and outer diameters of the forming space respectively, so that a forming process is swiftly performed by the annular forming punch 54.

In this case, since pressure is applied to the lower surface of the green compact due to pressing by the annular forming punch 54, the green density of the green compact P' is high toward the lower end. In contrast, the thickness of the green compact P' narrows toward the lower end due to the forming space narrowing toward the lower end.

A pressure applied during the single action uni-axis pressing process according to an exemplary embodiment of the present invention may be in the range of about 1 to 6 ton/cm$^2$.

Figure 5D:
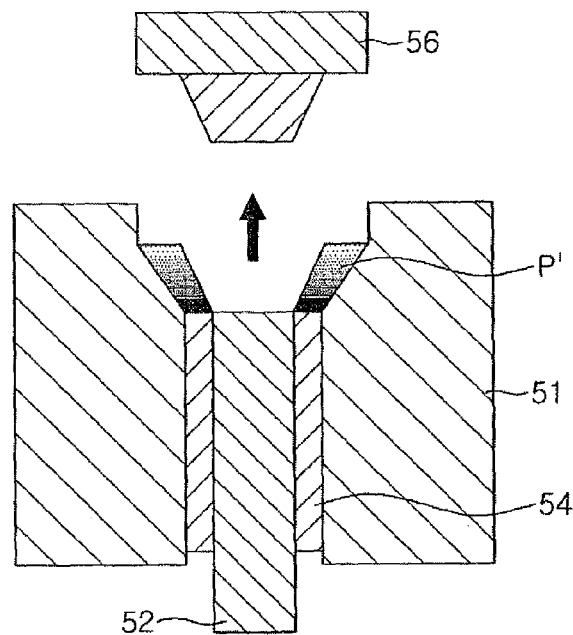
Figure 5E:
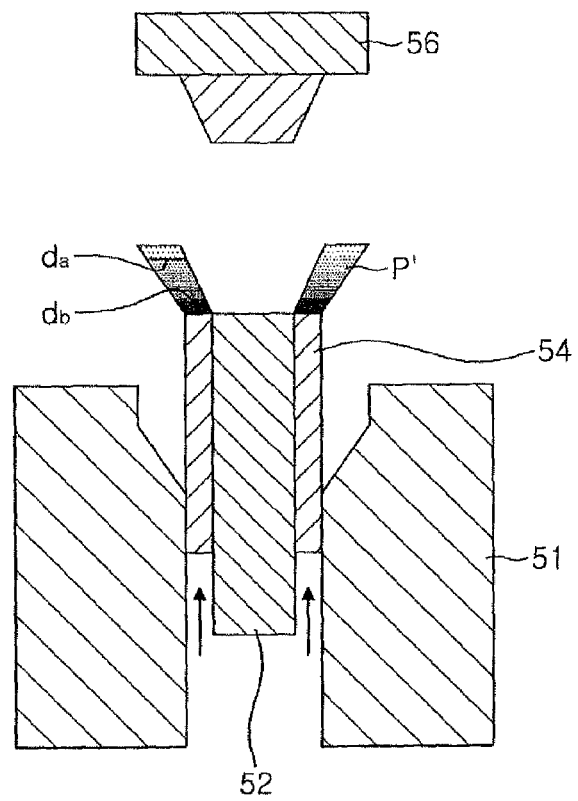

As illustrated in FIG. 5D, the conical forming inner central portion 56 is moved upward so that it is separated from the forming region, and then as illustrated in FIG. 5E, the annular forming punch 54 is moved upward, so that a desired annular green compact P' may be separated from the forming mold 51.

Figure 6:
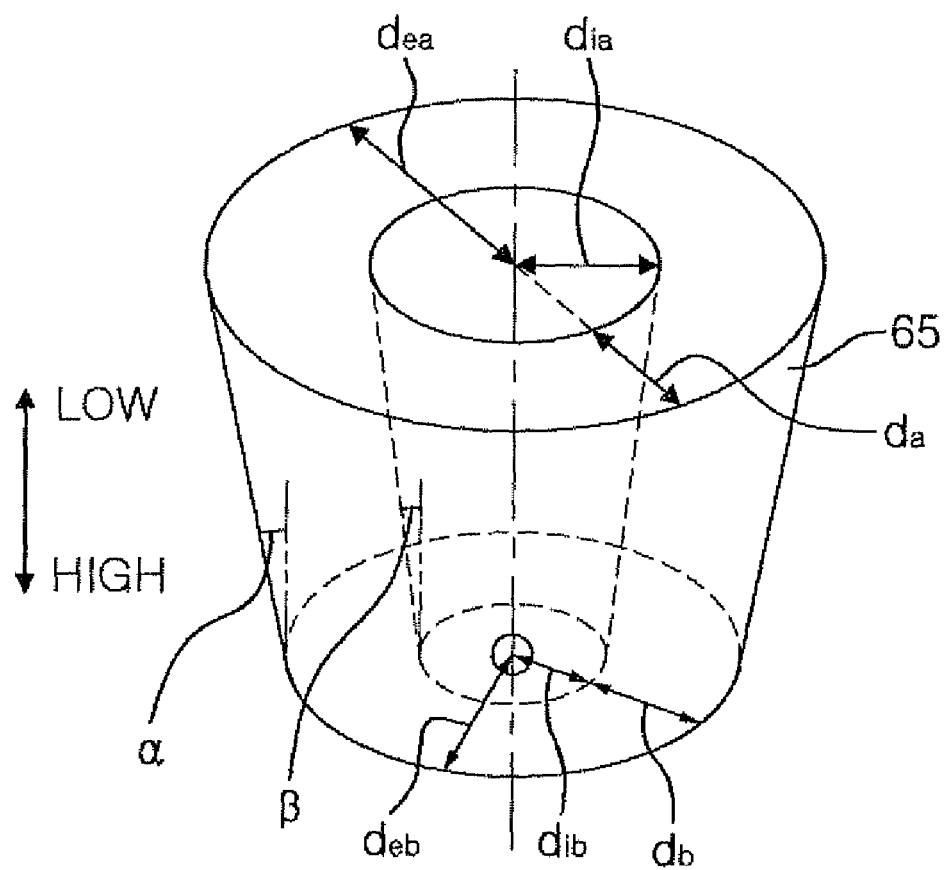
FIG. 6 is a perspective view illustrating an example of an annular green compact according to an exemplary embodiment of the present invention.

An example of an annular green compact 65 manufactured using the single action uni-axis pressing which uses the above-described inclined wall-type forming apparatus is illustrated in a perspective view of FIG. 6.

Referring to FIG. 6, similarly to the green compact manufactured using a straight wall-type forming apparatus, the density distribution of the annular green compact generates a green density incline in a predetermined direction and the lower portion close to a pressed surface has higher green density than that of the upper portion.

This is because a forming pressure is concentrated on the lower portion which is a pressed surface but an applied forming pressure is attenuated at the upper portion due to powder-powder friction and mold surface-powder friction, so that low pressure is transferred to the upper portion.

However, unlike a green compact using a straight wall-type forming mold, an annular green compact manufactured by the single action uni-axis pressing which uses the exemplified inclined wall-type forming apparatus has diameter distribution that increases toward the upper end along the height direction of the green compact. That is, the annular green compact manufactured using the single action uni-axis pressing has a structure in which the inner diameter $d_{ia}$ and the outer diameter $d_{ea}$ of the upper end are greatest and the inner diameter $d_{ib}$ and the outer diameter $d_{eb}$ of the lower end are smallest. In other words, the annular green compact manufactured by the single action uni-axis pressing has an annular structure in which the slope angle β of the inner wall is smaller than the slope angle α of the outer wall with respect to the central axis direction.

As described above, the annular green compact 65 illustrated in FIG. 6 may have greater inner and outer diameters at a portion having a higher sintering shrinkage. Therefore, in the case of sintering the annular green compact 65 under a reducing gas atmosphere, when different diameter distribution and sintering shrinkages depending on the height of the green compact are controlled, a sintered annular nuclear fuel pellet having relatively uniform inner and outer diameters along the height of the pellet may be manufactured.

Consequently, since a final sintered annular nuclear fuel pellet has a narrow diameter distribution and a small diametric tolerance along the height direction of the pellet, the inner and outer diametric tolerances may be improved to about 13 μm or less even without a grinding process for the pellet. Therefore, the inner and outer gaps of the annular nuclear fuel rod may be controlled more precisely without an additional process, and furthermore, a method that can address asymmetry of heat flux in an annular nuclear fuel rod may be realized.

The slope angle α of the outer wall of the annular pellet defined by the inner wall of the forming mold and the slope angle β of the inner wall of the annular pellet defined by the outer wall of the trapezoidal conical inner central portion may be determined on the basis of shrinkage change data depending on green density distribution of the pellet manufactured and sintered using the conventional straight wall-type forming mold. Since powder-powder friction and mold surface-powder friction may change depending on the kind of powder and a granule manufacturing condition, the angles α and β have different values depending on the conditions. Slope angles α and β for UO$_2$ powder manufactured using an ammonium diuranate (ADU) process, an ammonium uranyl carbonate (AUC) process, and an integrated direct route (IDR) where powder manufacturing processes are different and so powder shapes are different, and UO$_2$ granules prepared with different granule manufacturing conditions are given by Table 1.

TABLE 1

| Powder kind | Granule condition | Angle (°) α | β |
|---|---|---|---|
| ADU | Raw powder | 2.06 | 1.51 |
| ADU | 0.7 ton/cm$^2$ preliminary pressed and then sieved with 20-mesh | 1.52 | 1.11 |
| ADU | 1 ton/cm$^2$ preliminary pressed and then sieved with 20-mesh | 1.49 | 1.08 |
| AUC | Raw powder | 1.25 | 0.92 |
| IDR | 0.7 ton/cm$^2$ preliminary pressed and then sieved with 20-mesh | 1.02 | 0.75 |

The purpose, technical construction, and operation of the present invention will be described in more detail according to an exemplary embodiment of the present invention.

[Exemplary Embodiment]

ADU-UO$_2$ powder is preliminarily pressed with a pressure of about 0.7 ton/cm$^2$ to form a lump and the lump is broken into pieces and passed through a 20-mesh sieve, so that granules are prepared. Zinc stearate of about 0.3 wt % is added as a lubricant to the granules, and then mixed in a tubular mixer for 30 min.

The mixed granules are inserted into a single action uni-axis pressing apparatus having a inclined wall-type forming mold, and then uni-axial pressing is performed with a pressure of about 3 ton/cm$^2$, so that an annular green compact is manufactured. For angles α and β of the inclined wall-type forming mold, 1.11° and 1.52° have been applied, respectively. The inner diameter and the outer diameter of the annular green compact have been measured with an interval of about 1 mm along the height of the green compact using a contact three-dimensional measuring unit. The density of the annular green compact is about 47% of a theoretical density.

The annular green compact has been sintered under a hydrogen atmosphere at about 1730° C. for about 4 h. The density of the sintered annular pellet has been measured using the Archimedean method, and the inner and outer diameters of the sintered annular pellet have been measured with an interval of about 1 mm along the height of the pellet using a contact three-dimensional measuring unit. The density of the sintered annular pellet is about 96.5% of a theoretical density. The inner diameter, the outer diameter, and tolerances thereof of the annular green compact and the pellet for each operation are given by Table 2.

As revealed from Table 2, a method for manufacturing an annular pellet according to an exemplary embodiment of the present invention can provide an annular pellet whose inner and outer diametric tolerances are about ±13 μm or less without a grinding process.

TABLE 2

| Division | Inner diameter (mm) | | Outer diameter (mm) | |
| --- | --- | --- | --- | --- |
| | Average | Tolerance | Average | Tolerance |
| Green compact | 12.628 | 0.124 | 17.909 | 0.185 |
| Pellet | 9.825 | 0.005 | 13.929 | 0.010 |

COMPARATIVE EXAMPLE

ADU-UO$_2$ powder is preliminarily pressed with a pressure of about 0.7 ton/cm$^2$ to form a lump and the lump is broken into pieces and passed through a 20-mesh sieve, so that granules are prepared. Zinc stearate of about 0.3 wt % is added as a lubricant to the granules, and then mixed in a tubular mixer for 30 min.

The above-obtained granules are inserted into a single action uni-axis pressing apparatus having a straight wall-type forming mold, and then uni-axial pressing is performed with a pressure of about 3 ton/cm$^2$, so that an annular green compact is manufactured. The inner and outer surfaces of the straight wall-type forming mold are in parallel to the forming axis and thus the inclined angles thereof are 0°. The inner diameter and the outer diameter of the annular green compact have been measured with an interval of about 1 mm along the height of the green compact using a contact three-dimensional measuring unit, so that diametric tolerance is obtained. The density of the annular green compact is about 47% of a theoretical density.

After that, the annular green compact has been sintered under a hydrogen atmosphere at about 1730° C. for about 4 h. The density of the sintered annular pellet has been measured using the Archimedean method, and the inner and outer diameters of the sintered annular pellet have been measured using a contact three-dimensional measuring unit. The density of the sintered annular pellet is about 96.6% of a theoretical density. The inner diameter, the outer diameter, and the tolerances thereof of the annular green compact and the pellet according to the comparative example are given by Table 3.

As revealed from Table 3, according to the conventional method of uni-axis pressing using a straight wall-type mold, the inner and outer diametric tolerances are about ±78 μm and ±106 μm, respectively, which are greater than the tolerances of the inner and outer diameters of the annular pellet according to an exemplary embodiment of the present invention.

TABLE 3

| Division | Inner diameter (mm) | | Outer diameter (mm) | |
| --- | --- | --- | --- | --- |
| | Average | Tolerance | Average | Tolerance |
| Green compact | 12.401 | 0.001 | 17.546 | 0.002 |
| Pellet | 9.735 | 0.078 | 13.796 | 0.106 |

Figure 7A:
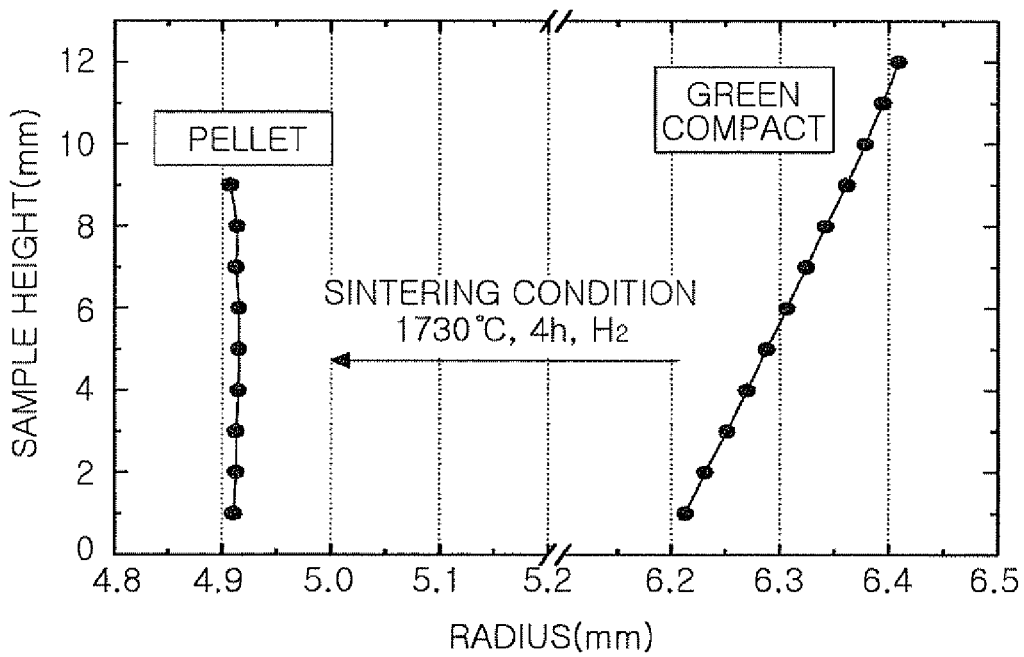
FIGS. 7A and 7B are graphs illustrating measurement results of an inner diameter and an outer diameter along central axes of an annular green compact and a pellet according to an exemplary embodiment of the present invention.
Figure 7B:
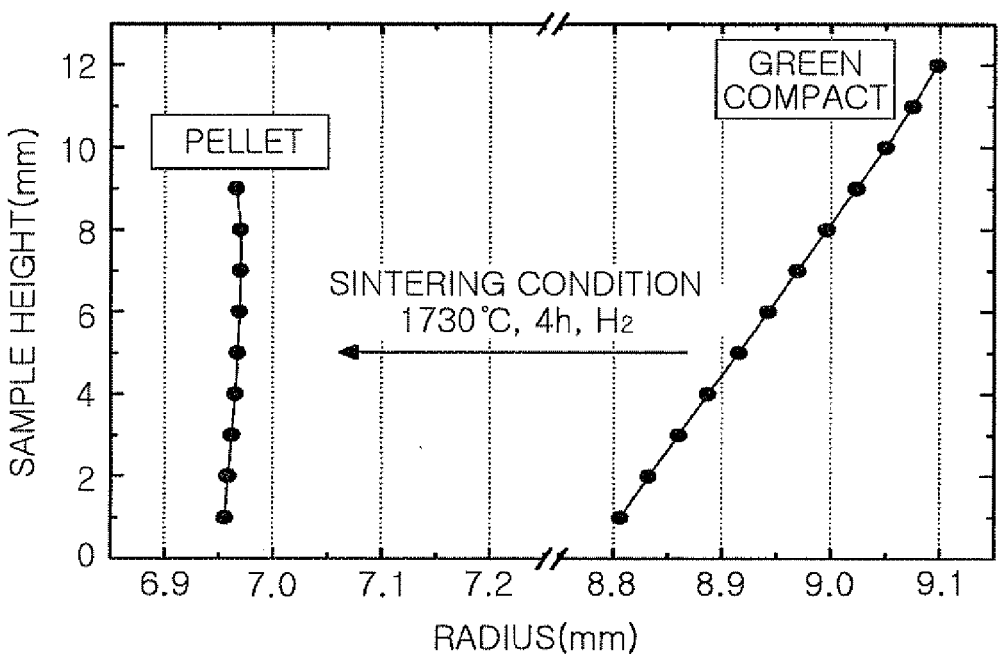
Figure 8A:
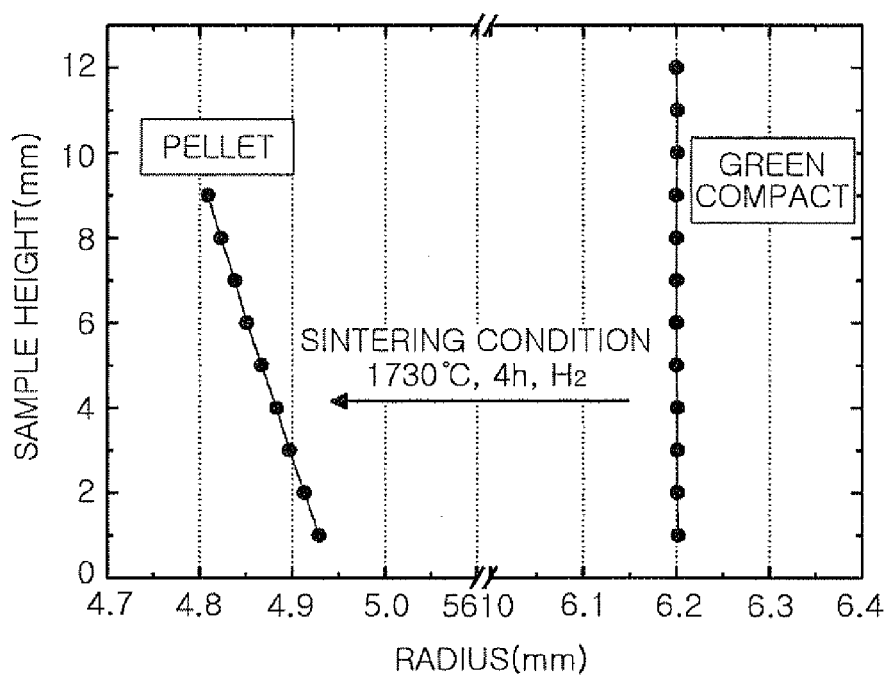
FIGS. 8A and 8B are graphs illustrating measurement results of an inner diameter and an outer diameter along central axes of an annular green compact and a pellet according to a comparative example of the present invention.
Figure 8B:
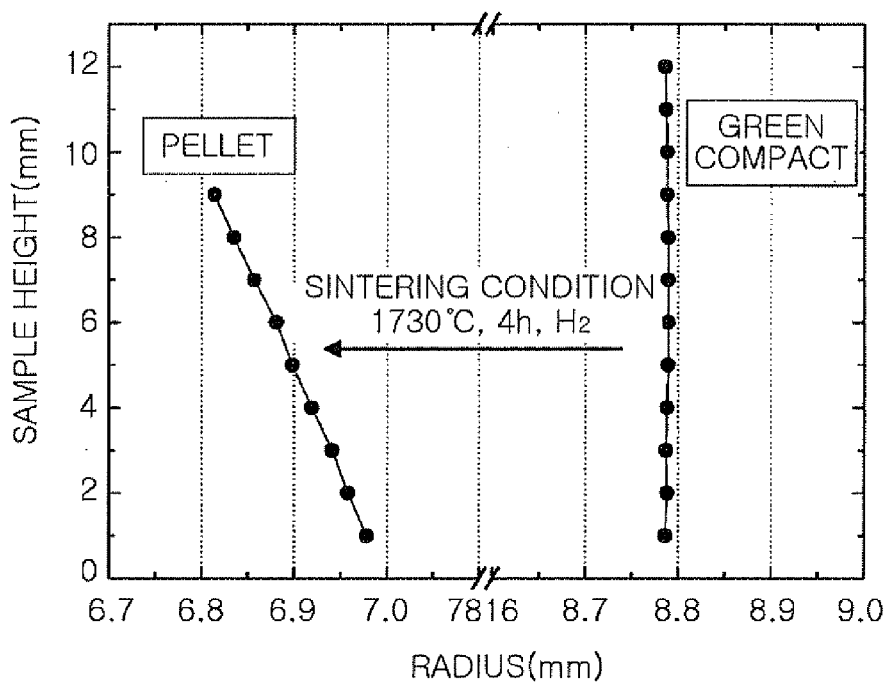

FIGS. 7 and 8 are graphs illustrating measurement results of an inner diameter and an outer diameter depending on the height of an annular green compact and an annular pellet manufactured according to an exemplary embodiment of the present invention and a comparative example.

As illustrated in FIG. 7, examination of the inner and outer diameter distribution of the annular green compact according to an exemplary embodiment of the present invention shows that both diameters of the inner surface and the outer surface increase along the height of the green compact. In contrast, the inner diameter and the outer diameter of the annular pellet sintered under a hydrogen atmosphere at about 1730° C. for about 4 h have constant values along the height of the pellet, so that the tolerances of the inner diameter and the outer diameter are about ±13 μm or less.

In contrast, both the inner diameter and the outer diameter of the annular green compact manufactured according to the comparative example show constant values along the height of the compact, but the inner diameter and the outer diameter of the annular pellet sintered under a hydrogen atmosphere at about 1730° C. for about 4 h change depending on the height of the pellet, so that large diametric tolerances are generated.

As set forth above, according to exemplary embodiments of the invention, constant inner diameter and outer diameter may be maintained along the height of a pellet in an annular nuclear fuel pellet. More particularly, the tolerances of an inner diameter and an outer diameter may be improved to 13 μm or less even without a grinding process for the pellet. Therefore, the inner and outer gaps of an annular nuclear fuel rod may be more precisely controlled without an additional process, and furthermore, a method that can address asymmetry of heat flux in an annular nuclear fuel rod may be realized.

In the long run, an effect of improving safety of an annular nuclear fuel rod can be provided. In addition, since a grinding process is not required, grinding sludge generated during the grinding process may be reduced. Thus, productivity improvement may be achieved.

While the present invention has been shown and described in connection with the exemplary embodiments, it will be apparent to those skilled in the art that modifications and variations can be made without departing from the spirit and scope of the invention as defined by the appended claims.

For example, since a nuclear fuel pellet where some or all of PuO$_2$, ThO$_2$, etc. which are nuclear fuel materials having the same lattice structures as that of the UO$_2$ has been replaced by UO$_2$ is similar to a nuclear fuel pellet according to the exemplary embodiment of the present invention in the manufacturing process and the sintering deformation aspect, the present invention is applicable to the above-mentioned nuclear fuel.

What is claimed is:

1. A method for manufacturing an annular nuclear fuel pellet, the method comprising:
    preparing an annular nuclear fuel green compact whose lateral cross-section is a trapezoid; and
    sintering the annular nuclear fuel green compact under a reducing gas atmosphere to obtain the annular nuclear fuel pellet,
    wherein a thickness of the annular nuclear fuel green compact decreases along one direction of a central axis, and a green density of the nuclear fuel green compact increases along one direction of the central axis,
    wherein the sintered annular nuclear fuel pellet has a uniform inner diameter along the height of the pellet, and
    wherein the preparing of the annular nuclear fuel green compact comprises:
    inserting one of nuclear fuel powder or granules into a forming apparatus for forming a shape of the annular nuclear fuel green compact; and
    applying a single action uni-axial pressing for a high green density-intended surface to one of the inserted powder or granules.

2. The method of claim 1, wherein the forming apparatus comprises:
    a forming mold comprising a first inclined inner wall for providing a forming region, and a second inner wall connected with the first inner wall;
    a cylindrical inner central portion mounted apart from the second inner wall of the forming mold to form an annular insertion space;
    a trapezoidal conical inner central portion including an outer wall for forming an annular forming space corresponding to a shape of the annular nuclear fuel green compact when disposed in the forming region; and
    an annular forming punch which is movable toward the forming space along the annular insertion space, for providing an object located in the annular insertion space to the forming space.

3. The method of claim 2, wherein the single action uni-axial pressing is executed by movement of the annular forming punch.

4. The method of claim 3, wherein pressure applied during the single action uni-axial pressing is in the range of about 1 to 6 ton/cm$^2$.

5. The method of claim 2, wherein an inner diameter and an outer diameter of the annular forming punch are smaller than an inner diameter and an outer diameter of the forming space, respectively.

6. The method of claim 1, wherein a slope angle of the outer wall of a trapezoidal conical inner central portion with respect to a forming axis is smaller than a slope angle of the first inner wall of the forming mold with respect to the forming axis.

7. The method of claim 6, wherein the outer wall of the trapezoidal conical inner central portion has a slope angle of more than about 0.001° and less than about 2° with respect to the forming axis.

8. The method of claim 6, wherein the first inner wall of the forming mold has a slope angle of more than about 0.001° and less than about 2.5° with respect to the forming axis.

9. The method of claim 7, wherein the first inner wall of the forming mold has a slope angle of more than about 0.001° and less than about 2.5° with respect to the forming axis.

10. The method of claim 1, wherein a tolerance of an inner diameter of the annular nuclear fuel pellet obtained after the sintering is about 13 μm or less.

11. The method of claim 1, wherein a tolerance of an outer diameter of the annular nuclear fuel pellet obtained after the sintering is about 13 μm or less.

12. The method of claim 10, wherein a tolerance of an inner diameter of the annular nuclear fuel pellet obtained after the sintering is about 13 μm or less.

13. The method of claim 1, wherein the reducing gas comprises a hydrogen gas.

14. The method of claim 1, wherein the reducing gas comprises a mixture of a hydrogen gas and at least one selected from the group consisting of carbon dioxide, water vapor, and an inert gas.

15. The method of claim 1, wherein the sintering is performed at temperature in the range of about 1600° C. to 1800° C.

16. The method of claim 1, wherein the nuclear fuel powder or granule comprises a ceramic material containing at least one fissile material selected from the group consisting of uranium, plutonium, and thorium.

* * * * *